United States Patent [19]
Lee

[11] Patent Number: 6,020,922
[45] Date of Patent: Feb. 1, 2000

[54] VERTICAL LINE MULTIPLICATION METHOD FOR HIGH-RESOLUTION CAMERA AND CIRCUIT THEREFOR

[75] Inventor: Hyo-seung Lee, Seoul, Rep. of Korea

[73] Assignee: Samsung Electronics Co., Ltd., Suwon, Rep. of Korea

[21] Appl. No.: 08/802,353

[22] Filed: Feb. 21, 1997

[30] Foreign Application Priority Data

Feb. 21, 1996 [KR] Rep. of Korea ................. 96-4060

[51] Int. Cl.$^7$ ................................................. H04N 3/15
[52] U.S. Cl. ................... 348/265; 348/234; 348/453; 348/336; 358/514; 358/483
[58] Field of Search .................... 348/262, 265, 348/336, 337, 222, 234, 236, 311, 445, 556, 458, 453; 358/514, 482, 483; 345/138

[56] References Cited

U.S. PATENT DOCUMENTS

| | | | |
|---|---|---|---|
| 4,558,347 | 12/1985 | Pritchard et al. | 358/11 |
| 4,583,113 | 4/1986 | Pritchhard | 348/450 |
| 5,436,661 | 7/1995 | Yamamoto et al. | 348/264 |
| 5,576,760 | 11/1996 | Akiyama | 348/231 |
| 5,640,206 | 6/1997 | Kinoshita et al. | 348/264 |
| 5,719,633 | 2/1998 | Nishio et al. | 348/441 |

FOREIGN PATENT DOCUMENTS

| | | |
|---|---|---|
| 0 605 738 A1 | 7/1994 | European Pat. Off. . |
| 0 661 872 A2 | 7/1995 | European Pat. Off. . |
| 0 680 210 A1 | 11/1995 | European Pat. Off. . |
| 2 090 505 | 7/1992 | United Kingdom . |

OTHER PUBLICATIONS

Takashi Shinozaki et al.: "4CCD Compact, Light–Weight, Consumer Use DHTV Camera" Conference on Consumer Electronics—Digest of Techni Papers, Rosemont, Jun. 7–9, 1995, No. Conf. 14, Jun. 7, 1995, pp. 128/129.

*Primary Examiner*—Wendy Garber
*Assistant Examiner*—Mitchell L. White
*Attorney, Agent, or Firm*—Staas & Halsey LLP

[57] ABSTRACT

A vertical line multiplication method and circuit multiplies the number of vertical lines of a video signal which is imaged by use of 4 CCDs to transform the video signal into another video signal having a higher resolution by controlling writing and reading of signals to and from memories. A first memory receives G1 channel data of a 0.5H period from a G1 CCD and outputs the written data at twice a speed of a writing speed. A second memory receives G2 channel data of a 1H period from a G2 CCD and outputs the written data at twice the speed of the writing speed. A selection device selects the data from the first and second memories alternately and outputs the selected signals sequentially as a wide bandwidth G signal.

31 Claims, 7 Drawing Sheets

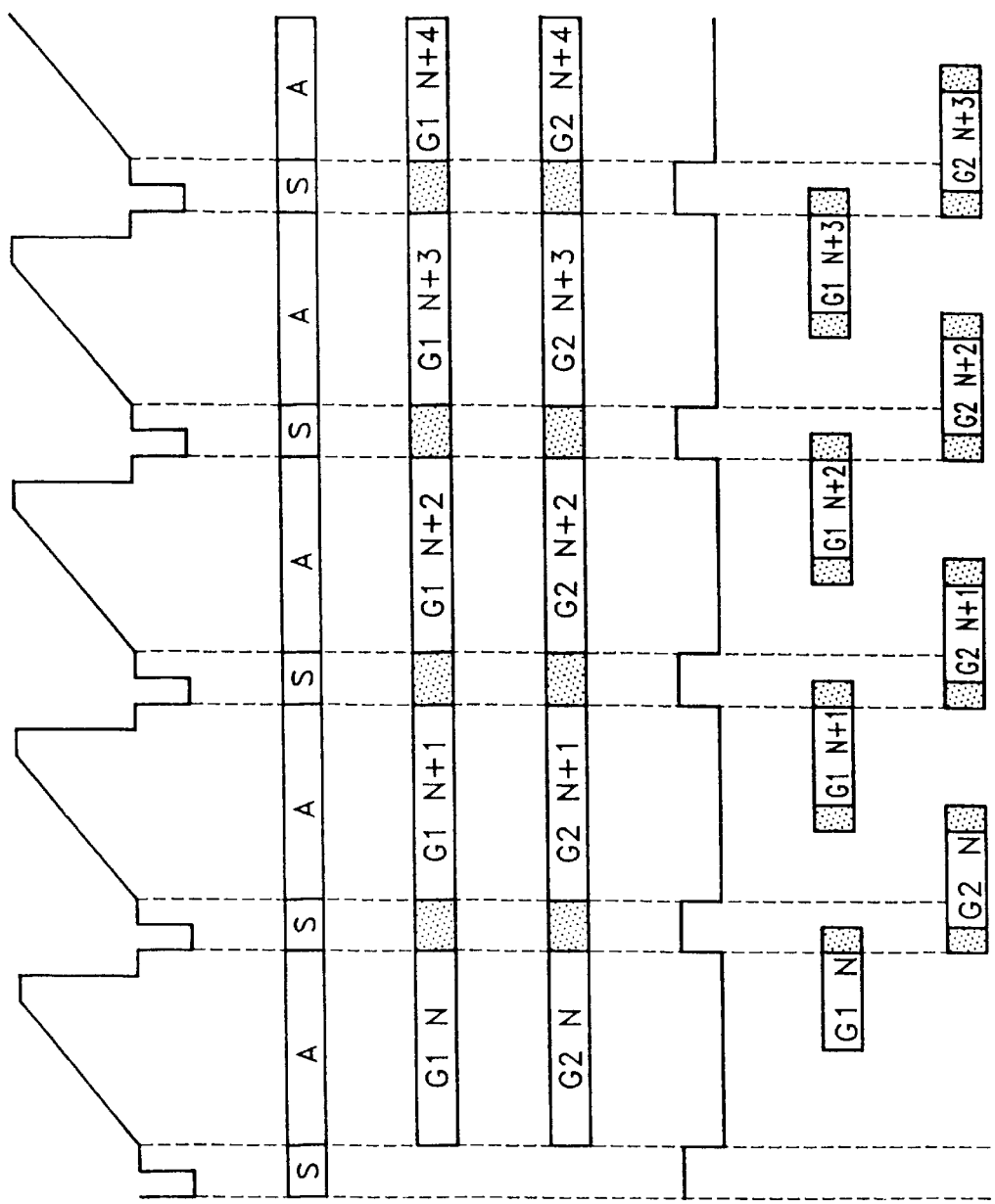

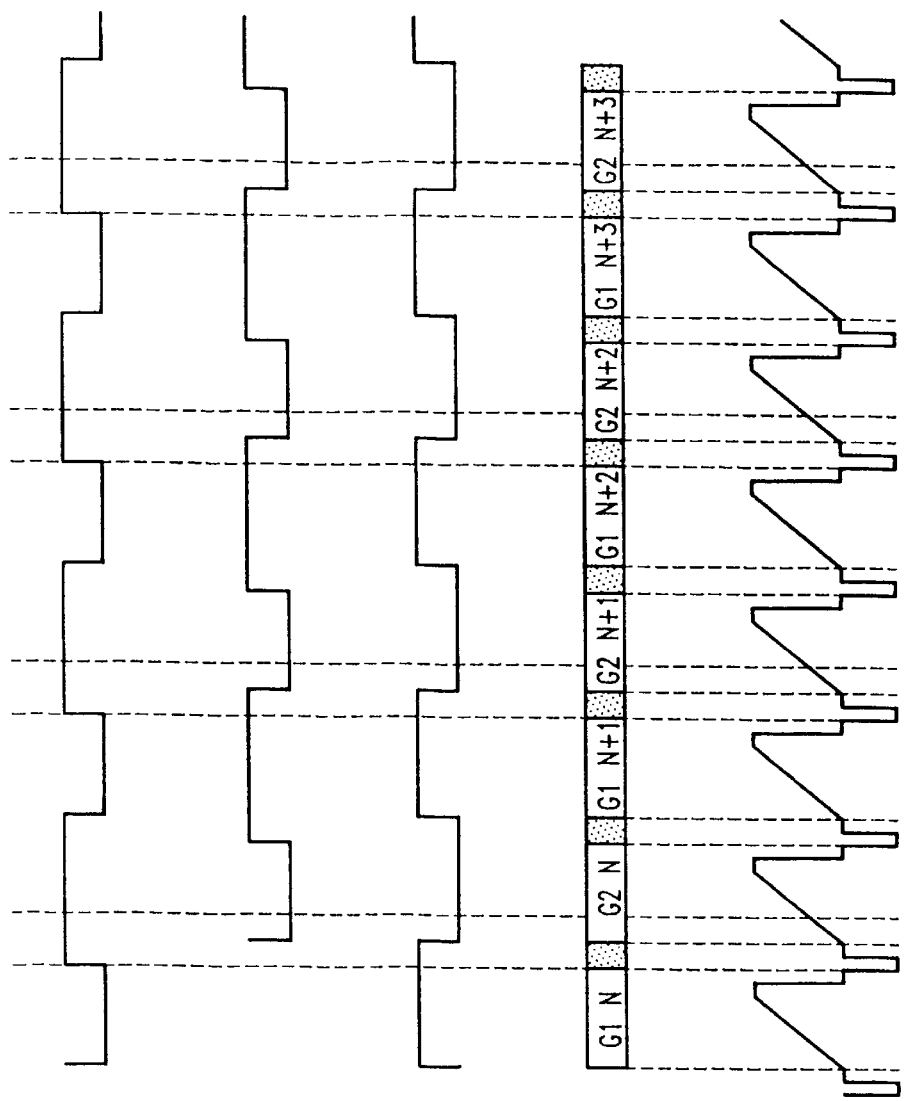

VERTICAL LINE MULTIPLICATION METHOD FOR HIGH-RESOLUTION CAMERA AND CIRCUIT THEREFOR

BACKGROUND OF THE INVENTION

1. Field of the Invention

The present invention relates to a vertical line multiplication method for a high-resolution camera and a circuit therefor. More particularly, the present invention relates to a vertical line multiplication method and circuit for multiplying the number of vertical lines of a video signal which is imaged by use of 4 charge coupled devices (CCDs) to transform the signal into another video signal having a higher resolution by controlling writing and reading of signals to and from a memory.

2. Description of the Related Art

Recent experimentation with digital broadcasting of high-definition television (HDTV) and the commercialization of "wide" televisions having an aspect ratio of 16:9 have created the need for a charge-coupled device (CCD) camera which supports the imaging techniques of various standards, i.e., HDTV, wide TV and the NTSC standard now in common use.

Generally speaking, camera performance improves and equipment costs rise as the number of charge-coupled devices increases. commercially available cameras for home use usually have employed a single-plate CCD, while a three-plate CCD has been produced for business use such as at a broadcasting station.

A four-plate CCD camera, having a much more complex signal processing structure than the triple-plate CCD camera, offers excellent performance and supports the high resolution of the HDTV standard.

Here, the "HDTV standard" includes a high vision standard developed in Japan, a GA-HDTV standard proposed by the Grand-Alliance (GA) committee in the United States, an ATV standard and a HD standard.

The high vision standard has 1035 effective vertical lines among 1125 total lines and 1920 effective pixels among 2200 total pixels in each horizontal line. The GA-HDTV standard has 1035 effective vertical lines among 1125 total lines and 1258 effective pixels among 1440 total pixels in each horizontal line. The ATV standard has 1080 effective vertical lines among 1125 total lines and 1920 effective pixels among 2200 total pixels in each horizontal line. The HD standard has 1024 effective vertical lines among 1125 total lines and 1008 effective pixels among 1200 total pixels in each horizontal line.

A household HDTV camera employing a 4-CCD technique has to have advantage of being compatible with other formats, i.e., existing NTSC and wide TV formats while being low-cost.

Meanwhile, a household NTSC standard CCD currently being used cannot be used for a high vision standard camera since the number of effective vertical lines of the NTSC CCD is only 485, which is shorter than half of the effective vertical lines, i.e., 1035, of the high vision standard. Also, even though a PAL CCD has enough effective vertical lines, a PAL CCD cannot be used for a high vision standard camera either since the requirement of the number of horizontal pixels is not satisfied.

To overcome these problems, it is possible to use a general purpose CCD having 630,000 pixels (726 vertical lines and 858 horizontal pixels) for a PAL hand trimming compensation as a CCD for a household HDTV camera, and control the CCD so that some part of the CCD is used depending on a standard, as shown in FIG. 1.

FIG. 1 shows the available area of a CCD for each standard: 16:9 high vision, 16:9 NTSC for wide TV and 4:3 SD (standard definition) standards.

For its compatibility, the household 4-CCD camera shown in FIG. 1 uses 808H×518V, 754H×485V and 566H×485V of the total number of pixels for the 16:9 high vision, the 16:9 NTSC, and the 4:3 SD, NTSC standards, respectively.

FIG. 2 illustrates the structure of an optical system employing a 4-CCD design. The optical system includes first through third optical lowpass filters (LPFs), a prism, and four CCDs fixed to the prism.

Here, a light passing through a lens passes through the optical LPF 1 before being incident on the prism 10. When incident light is sampled by use of the CCDs, an aliasing may be present due to the limitation of the number of pixels. Thus, the optical LPF 1 attenuates the aliasing component which exceeds the Nyquist frequency among the incident light.

The light incident on the prism 10 is divided into green (G), red (R) and blue (B) signals according to their wavelengths at the boundary of the prism. Further, the G signal is divided into G1 and G2 signals before entering the CCDs. Light divided into the blue (B) signal is incident on the optical LPF 2 and then passes through to the B CCD, whereas the light divided into the red (R) signal is incident on the optical LPF 3 and then passes through to the R CCD. Two CCDs (G1 CCD and G2 CCD) are provided for the G signal because the G signal has the highest ratio (70% for HD standard) among the Y signal distribution and because it is highly sensitive. Meanwhile, the G1 CCD and the G2 CCD are disposed so that the G2 CCD outputs a video signal which is shifted by one horizontal line from a video signal output by the G1 CCD.

On the other hand, the light incident on the G1 CCD or G2 CCD has about twice the bandwidth as that of the R CCD or the B CCD, due to the characteristics of the optical LPFs.

FIG. 3A shows the frequency characteristics of the first through third optical LPFs. The first LPF directly affects the G1 and G2 signals, but the second and third LPFs affect only the B and R signals, respectively, since they are located in front of the R CCD and the B CCD. Here, Fn denotes a normalized maximum frequency that can be recognized as a signal during the sampling of light in CCDs. As a result, the frequency characteristics of the light incident on the B CCD can be obtained by performing an inner product operation of the frequency characteristics of LPF 1 and that of LPF 2. Also, the frequency characteristics of the light incident on the R CCD can be obtained by performing an inner product operation of the frequency characteristics of LPF 1 and that of LPF 3. The resultant frequency characteristics of the light incident on the R CCD and the B CCD is shown in FIG. 3B.

FIG. 4 is a block diagram of a signal processing system for transforming an NTSC signal output by a CCD into an HDTV signal, which is disclosed in *ITE Technical Report*, Vol. 19, No. 20, pp 53–58, Mar. 17, 1995.

Signal processing is digitalized in the circuit shown in FIG. 4 to process various broadcasting standards, in other words, to enable imaging in different modes including NTSC 16:9 and NTSC 4:3 modes as well as a high-definition television mode.

In the case of a high vision camera employing an exclusive CCD with more than $10^6$ pixels, the digitalization of its circuit has made little progress since the horizontal transfer clock of the CCD is higher than 37 MHZ and its signal processing is difficult. However, when a PAL hand trimming compensation 4-CCD is used, the digitalization of its circuit is possible since the horizontal transfer clock of the CCD is as low as about 16 MHZ and its signal processing is easy.

In FIG. 4, G1 and G2 signals output from two G CCDs (G1 CCD and G2 CCD, respectively) in accordance with the 16 MHZ clock signal, are converted into digital signals and supplied to a horizontal interpolation circuit 14 through a contour correction circuit 12.

The horizontal interpolation circuit 14 interpolates pixels in the horizontal direction and outputs the interpolated signal in accordance with a 32 MHZ clock signal.

The G channel vertical line multiplication circuit 16 rearranges the signals originated from the G1 CCD and the G2 CCD which are being shifted one horizontal line vertically so that they are in time with a displaying order, and compresses the rearranged signal in time. Afterwards, the 6 channel vertical line multiplication circuit 16 outputs the compressed signal in accordance with a 64 MHZ clock signal as a wide bandwidth G signal.

Here, the clock speed doubles after a horizontal interpolation and doubles again after a vertical line multiplication to be four times the input clock speed.

A G-Y transformation circuit 18 combines the wide bandwidth G signal and a $G_L$-$Y_L$ signal from the multi-speed transformation circuit 26 to output a wide bandwidth Y signal.

On the other hand, a lowpass filter (LPF) 20 carries out lowpass filtering of the analog-to-digital converted G1 and G2 signals to output the low frequency components $G_L$ of such signals.

A color matrix circuit 22 receives the $G_L$ signal output by the LPF 20 and analog-to-digital converted R and B signals, generates color difference signals, R-$Y_L$, G-$Y_L$ and B-$Y_L$, and outputs such color difference signals.

A vertical line interpolation circuit 24 interpolates pixels in the vertical direction with respect to each of the color difference signals, R-$Y_L$, G-$Y_L$ and B-$Y_L$.

The multi-speed transformation circuit 26 inputs the interpolated color difference signals and carries out vertical line multiplication.

Afterwards, the vertical-line-multiplicated signals R-$Y_L$ and B-$Y_L$ are converted into analog signals in accordance with a 32 MHZ clock signal.

Therefore, a household camera which complies with an HDTV standard by using four PAL hand trimming compensating CCDs, carries out a horizontal interpolation and a vertical line multiplication for a G signal, but only a vertical line multiplication for R and B signals which have half the amount of G signal information, as shown in FIG. 4.

Meanwhile, the detailed configuration of the vertical line multiplication circuit is not disclosed in the above literature.

SUMMARY OF THE INVENTION

One object of the present invention is to provide a vertical line multiplication method for multiplying the number of vertical lines of a video signal which is imaged by use of 4 CCDs to transform the signal into another video signal having a higher resolution by controlling writing and reading of signals to and from a memory.

Another object of the present invention is to provide a vertical line multiplication circuit for multiplying the number of vertical lines of a video signal which is imaged by use of 4 CCDs to transform the signal into another video signal having a higher resolution by controlling writing and reading of signals to and from a memory.

To achieve one of the objects above, there is provided a vertical line multiplication circuit for multiplying the number of vertical lines to transform a first broadcasting type signal which is imaged by use of 4 CCDs including G1CCD, G2 CCD, R CCD and B CCD into a second broadcasting type signal having a higher resolution than that of the first broadcasting type signal, comprising the steps of (a) writing G1 channel data of a 0.5H period from the G1 CCD and then reading out the written data at twice a speed of a writing speed; (b) writing G2 channel data of a 1H period from the G2 CCD and then reading out the written data at twice the speed of the writing speed; and (c) selecting the data read out in the steps (a) and (b) alternately and outputting selected signals sequentially as a wide bandwidth G signal.

To achieve another one of the objects above, there is provided a vertical line multiplication circuit for multiplying the number of vertical lines to transform a first broadcasting type signal which is imaged by use of 4 CCDs including G1 CCD, G2 CCD, R CCD and B CCD into a second broadcasting type signal having a higher resolution than that of the first broadcasting type signal, comprising a first memory for writing G1 channel data of a 0.5H period from the G1 CCD and reading out the written data at twice a speed of a writing speed; a second memory for writing G2 channel data of a 1H period from the G2 CCD and reading out the written data at twice the speed of the writing speed; and a selection device for selecting the data from the first and second memories alternately and outputting selected signals sequentially as a wide bandwidth G signal.

BRIEF DESCRIPTION OF THE DRAWINGS

The above and other objects and advantages of the present invention will become more apparent by describing in detail preferred embodiments thereof with reference to the attached drawings in which:

FIGS. 6A–6L are timing diagrams of the input and output signals from various portions of the vertical line multiplication circuit of FIG. 5.

DETAILED DESCRIPTION OF THE INVENTION

Figure 1:
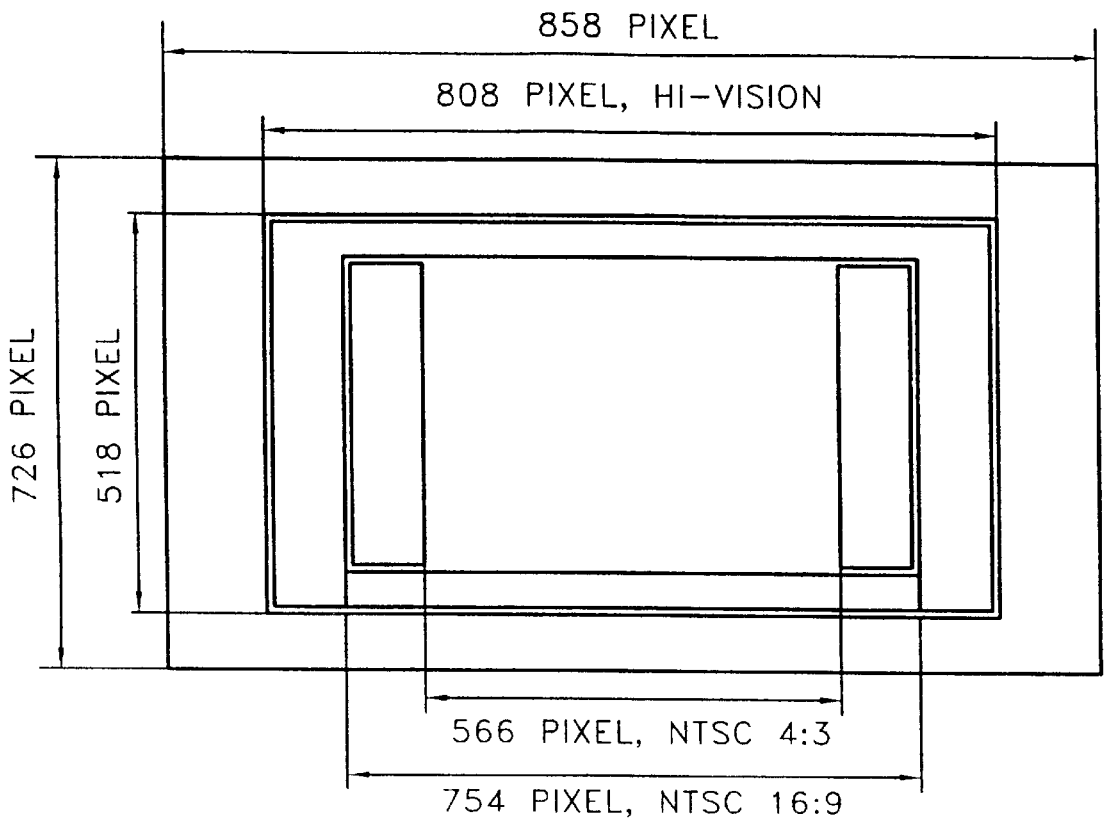
FIG. 1 shows the available area of a CCD for each of a number of standards.
Figure 2:
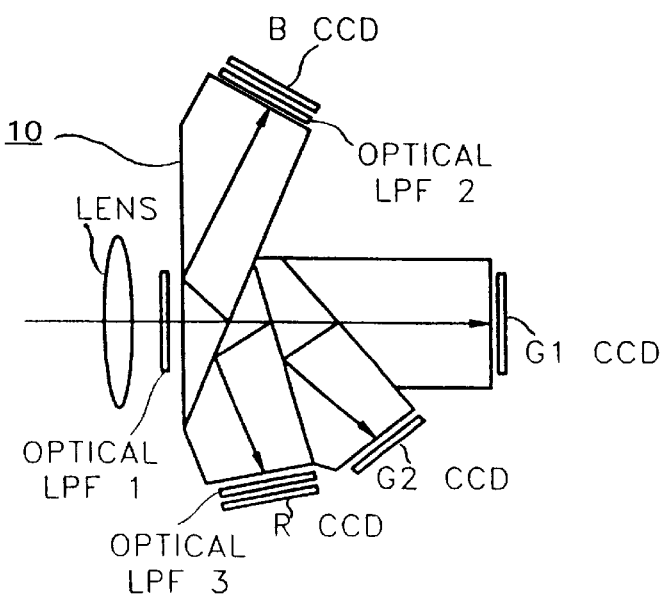
FIG. 2 illustrates the structure of an optical system employing a 4-CCD.
Figure 3A:
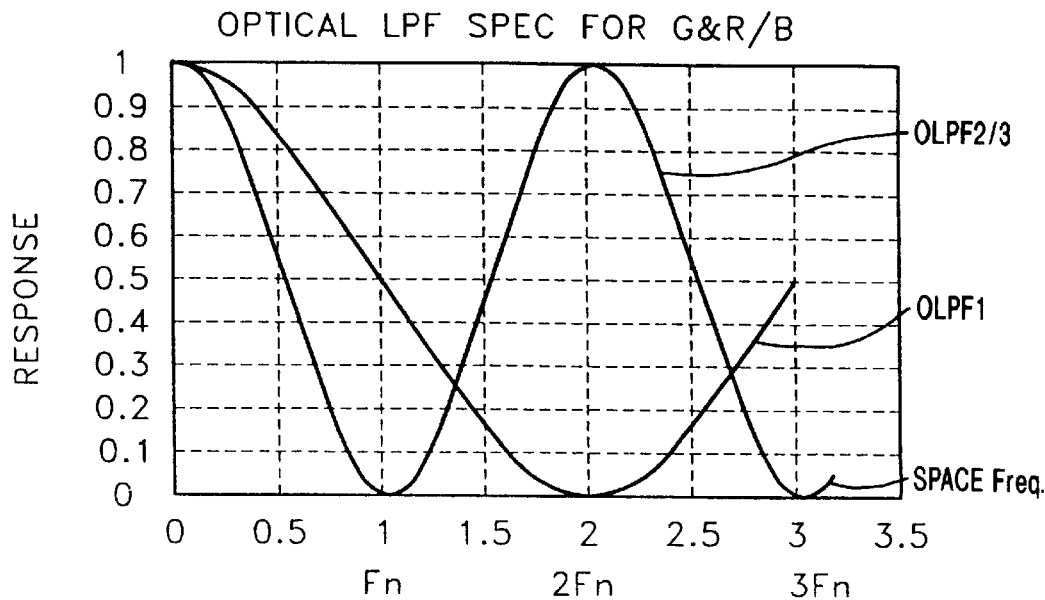
FIG. 3A shows the frequency characteristics of first through third optical lowpass filters shown in FIG. 2.
Figure 3B:
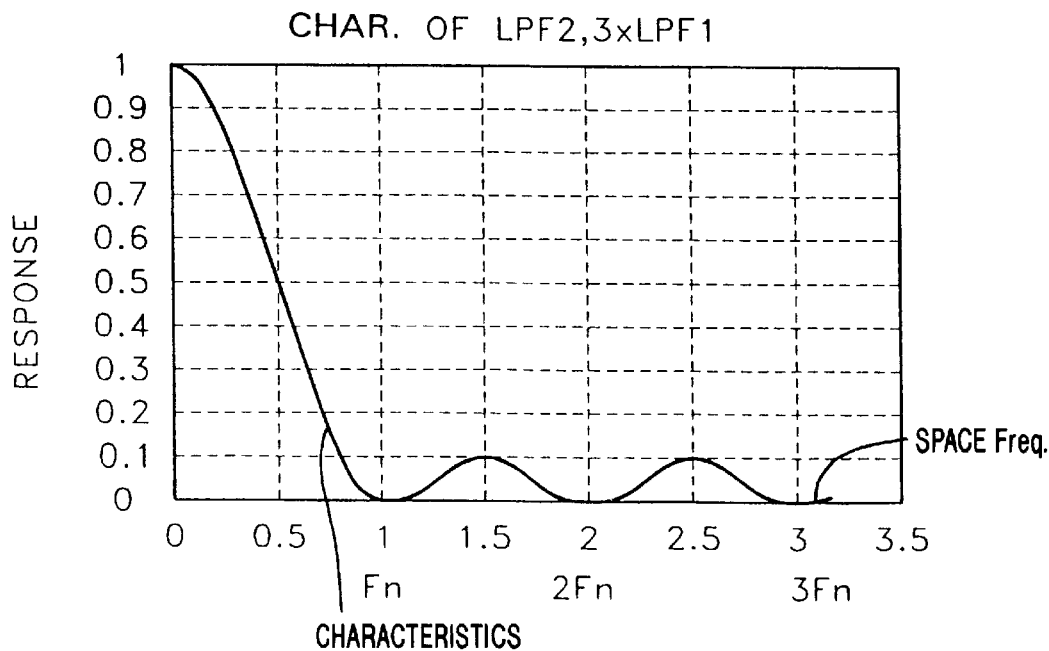
FIG. 3B shows frequency characteristics of the light incident on the R CCD and the B CCD of FIG. 2.
Figure 4:
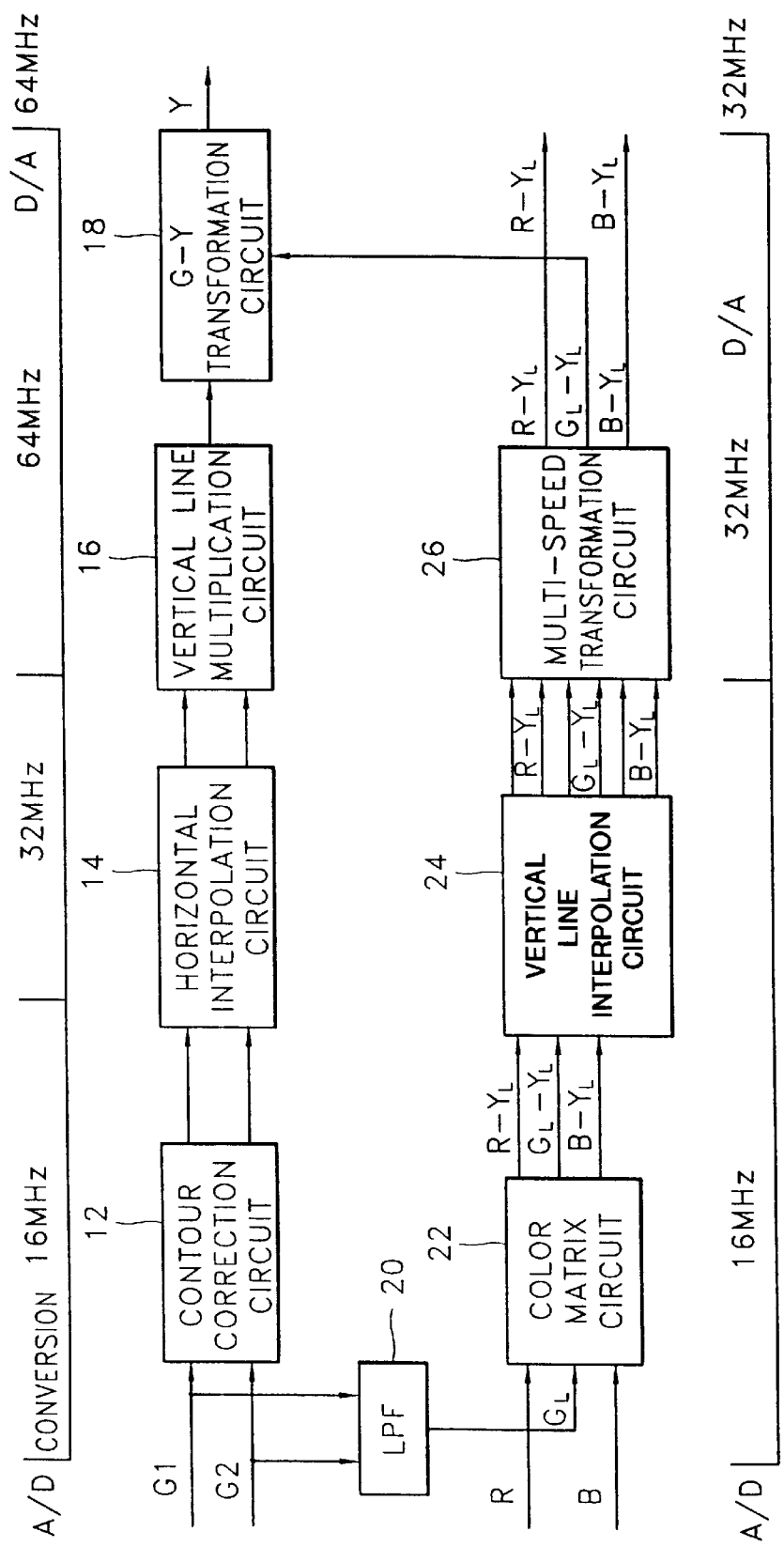
FIG. 4 is a block diagram of a signal processing system for transforming an NTSC CCD output into an HD signal.
Figure 5:
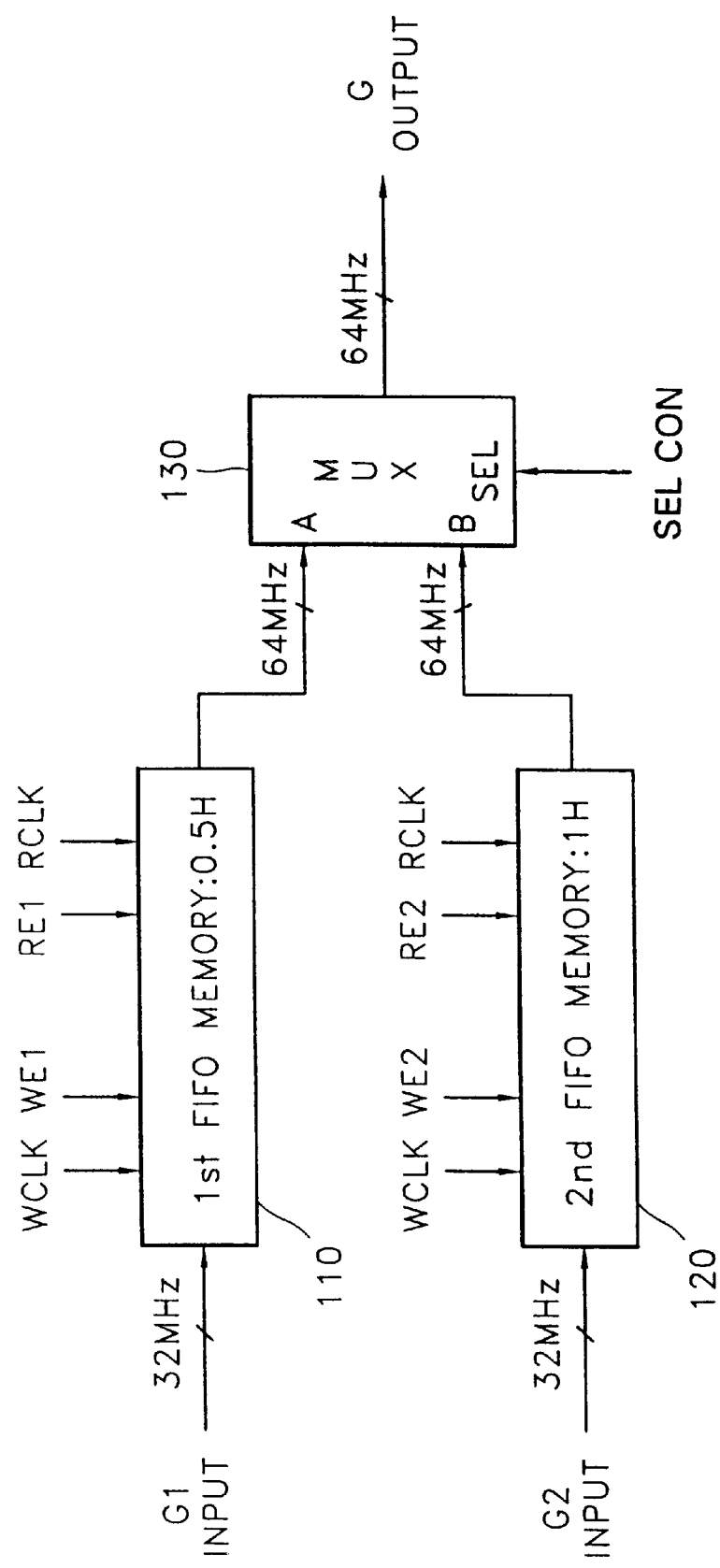
FIG. 5 is a block diagram of a vertical line multiplication circuit according to a first embodiment of the present invention.

FIG. 5 is a block diagram of a vertical line multiplication circuit according to a first embodiment of the present invention, which may be used as the vertical line multiplication circuit 16 of FIG. 4.

The circuit shown in FIG. 5 includes a first FIFO memory 110, a second FIFO memory 120 and a multiplexer 130.

The first FIFO memory 110 has a capacity which can store image data of half a horizontal line (0.5H) so that it can store G1 data corresponding to 0.5H. Also, the first FIFO memory 110 outputs the stored data at twice the writing speed.

The second FIFO memory 120 has a capacity which can store image data of a horizontal line (1H) so that it can store G2 data corresponding to 1H. Also, the second FIFO memory 120 outputs the stored data at twice the writing speed.

The multiplexer 130 selects one of the output signals from the first and the second FIFO memories 110 and 120 according to a selection control signal SEL CON and outputs a wide bandwidth G signal.

The operations of the circuit shown in FIG. 5 will now be described with reference to FIGS. 6A through 6L.

In FIG. 5, G1 and G2 channel video signals, being imaged through the G1 CCD and the G2 CCD (not shown in the figure), are analog-to-digital converted and input to the first and the second FIFO memories 110 and 120, respectively. Here, G1 and G2 channel video signals are shown roughly in FIG. 6A.

As shown in FIG. 6B, the input video signal shown in FIG. 6A includes effective pixel portions (A) and sync portions (S). Thus, write-enabling signals WE1 and WE2 which are active at "LOW" periods and shown in FIG. 6E are supplied to the first and the second FIFO memories 110 and 120, so that only the effective pixel portions (A) are written to the first and the second FIFO memories 110 and 120.

Data of the G1 channel is written into the first FIFO memory 110 in accordance with the first write-enabling signal WE1 shown in FIG. 6E and the writing clock signal WCLK, as shown in FIG. 6C. Afterwards, the data stored in the first FIFO memory 110 is read out in accordance with the first read-enabling signal RE1 shown in FIG. 6H and the reading clock signal RCLK which has a frequency twice that of the writing clock signal WCLK.

Data of the G2 channel is written into the second FIFO memory 120 in accordance with the second write-enabling signal WE2 shown in FIG. 6E and the writing clock signal WCLK at the same time as data of G1 channel data, as shown in FIG. 6D. Afterwards, the data stored in the second FIFO memory 120 is read out in accordance with the second read-enabling signal RE2 shown in FIG. 6I and the reading clock signal RCLK which has a frequency twice that of the writing clock signal WCLK after G1 channel data of 0.5H period is read out two times during the first read-enabling signal RE1 (FIG. 6H).

Here, the frequency of the writing clock signal WCLK is 32 MHZ and that of the reading clock signal RCLK is 64 MHZ.

As shown in FIG. 6F, when half of the effective pixel portions of the G1 channel data G1 N is written into the first FIFO memory 110, the reading out of the G1 channel data G1 –N stored in the first FIFO memory 110 is initiated.

Since the remaining half of the effective pixel portions of G1 channel data G1 N is continuously written into the first FIFO memory 110 as shown in FIG. 6C while the first 0.5H period of G1 channel data stored in the first FIFO memory 110 is read out in a speed double the writing speed, the reading out of the remaining 0.5H period of G1 channel data G1 N stored in the first FIFO memory 110 is completed when the remaining 0.5H period of G1 channel data G1N is completely written, as shown in FIG. 6F.

When a half sync period has elapsed after a 0.5H line of the G1 channel data G1 N is completely read out from the first FIFO memory 110, G2 channel data G2 N which has been written at the same time as G1 channel data G1 N is read out from the second FIFO memory 120 at twice the speed of the writing speed, as shown in FIG. 6G.

When a half sync period has elapsed after a 1H line of the G2 channel data G2 N is completely read out from the second FIFO memory 120, G1 channel data G1 N+1 is read out from the first FIFO memory 110.

The above procedures are repeated every 1H period. The multiplexer 130 alternately selects the outputs of the first and the second FIFO memories 110 and 120 according to a selection control signal MUX SELECT shown in FIG. 6J, and finally outputs the selected signal as shown in FIG. 6K. The final output signal from the multiplexer 130 is shown in FIG. 6L.

Here, the first and the second writing clock signals WCLK1 and WCLK2, the first and the second reading clock signals RCLK1 and RCLK2, the first and the second write-enabling signals WE1 and WE2, and first and the second read-enabling signals RE1 and RE2 which are input to the first and the second FIFO memories 110 and 120, and the selection control signal MUX SELECT input to the multiplexer 130 are generated and output by an external timing and clock signal generator (not shown).

Meanwhile, the first and second FIFO memories 110 and 120 may include dual-port random access memories (RAM), and the multiplexer 130 may be referred to as a selection device.

Even though the circuit shown in FIG. 5 was described in terms of the vertical line multiplication of G1 and G2 signals, the circuit can also be applied to a vertical line multiplication of color difference signals, $R-Y_L$, $B-Y_L$ and $G_L-Y_L$.

Figure 7:
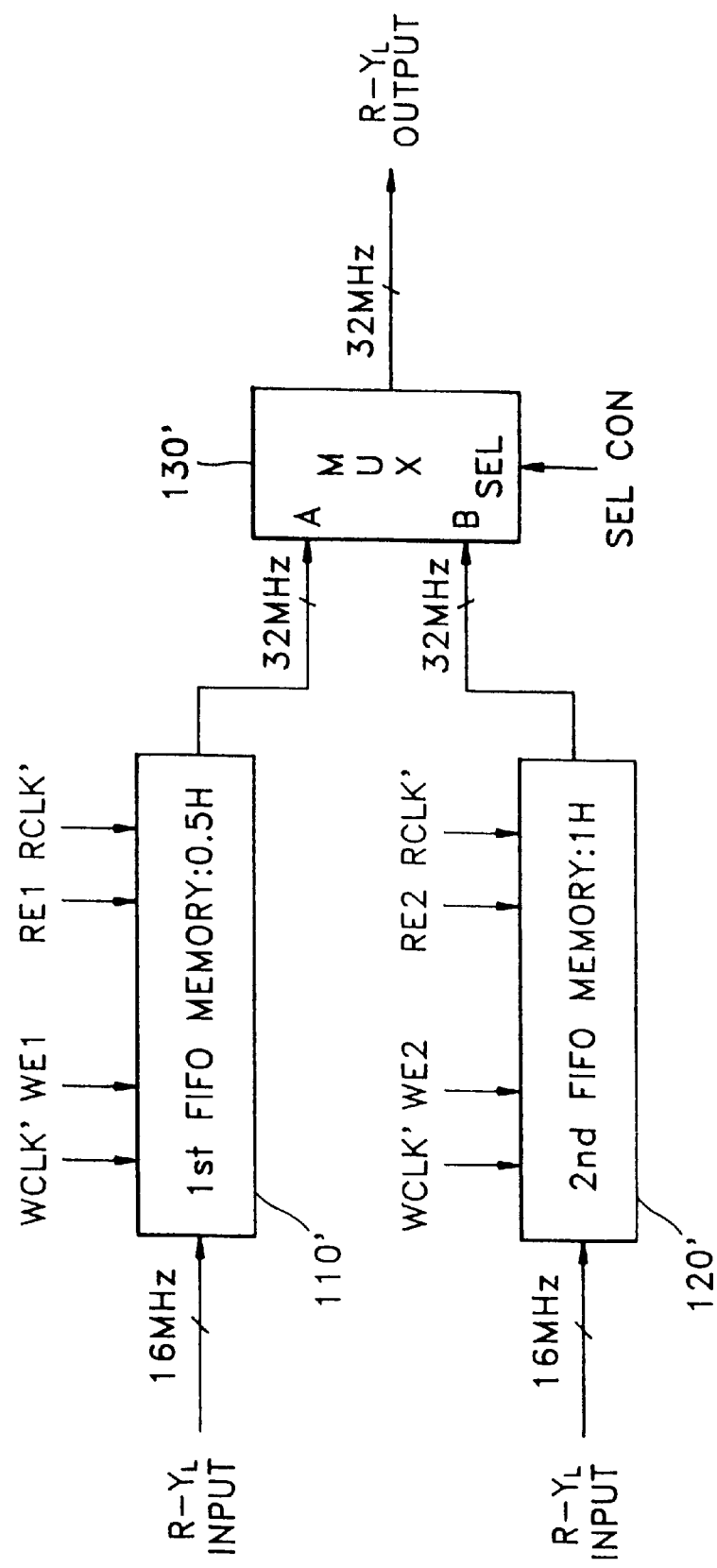
FIG. 7 is a block diagram of a vertical line multiplication circuit according to a second embodiment of the present invention.

FIG. 7 is a block diagram of a vertical line multiplication circuit according to a second embodiment of the present invention.

The structure of the circuit shown in FIG. 7 is similar to that shown in FIG. 5. For convenience, a vertical line multiplication circuit only for an $R-Y_L$ signal is shown in the figure. However, when the circuit shown in FIG. 7 is to be used as the multiplication circuit 26 shown in FIG. 4, three such circuits arranged in parallel are required for carrying out a vertical line multiplication for each color difference signal, $R-Y_L$, $B-Y_L$ and $G_L-Y_L$.

Referring to FIG. 7, the frequencies of the writing and reading clock signals WCLK' and RCLK' of the first and second FIFO memories 110' and 120' are 16 MHZ and 32 MHZ, respectively, which are half that of the writing and reading clock signals WCLK and RCLK of the first and second FIFO memories 110 and 120 shown in FIG. 5. Also, the multiplexer 130 inputs and outputs a color difference signal whose vertical line frequency is multiplied to 32 MHZ.

Even though the circuit shown in FIG. 7 was described in terms of a vertical line multiplication of color difference signals, the circuit can be used for a vertical line multiplication of R or B channel signals output by an R CDD or a B CCD, respectively.

Also, the present invention is applicable to a video format transformation system for transforming a current type of broadcasting signal into an HDTV format signal, as well as to a household HDTV camera.

As described above, the present invention can reduce the manufacturing cost of a video camera or a video format transformation system since the present invention can adapt the image signal captured by a general-purpose CCD into a high resolution standard by multiplying the number of vertical lines simply.

What is claimed is:

1. A vertical line multiplication method for multiplying a number of vertical lines to transform a first broadcasting type signal, which is imaged by use of four charge coupled devices (CCDs) including a G1 CCD, a G2 CCD, an R CCD and a B CCD, into a second broadcasting type signal having a higher resolution than that of the first broadcasting type signal, comprising the steps of:

(a) writing G1 channel data of a 1H period from the G1 CCD and reading out the written G1 channel data of the 1H period at twice a speed of a writing speed of the G1 channel data, wherein the reading out of the written 1H period data is initiated when 0.5H period G1 channel data is completely written;

(b) writing G2 channel data of a 1H period from the G2 CCD and then reading out the written G2 channel data at twice a speed of a writing speed of the G2 channel data; and (c) selecting the G1 and G2 channel data read out in said steps (a) and (b) alternately for predetermined time periods, respectively, to output the selected signals sequentially as a wide bandwidth G signal.

2. A vertical line multiplication method for multiplying a number of vertical lines to transform a first broadcasting type signal, which is imaged by use of four charge coupled devices (CCDs) including a G1 CCD, a G2 CCD, an R CCD and a B CCD, into a second broadcasting type signal having a higher resolution than that of the first broadcasting type signal, comprising the steps of:

(a) lowpass-filtering G1 and G2 channel data from the G1 CCD and G2 CCD, respectively, to output low-frequency G channel data;

(b) generating color difference signals, R-$Y_L$, B-$Y_L$ and $G_L$-$Y_L$ by use of R channel data from the R CCD, B channel data from the B CCD, and the low-frequency G channel data, respectively;

(c) writing each of the color difference signals of a 1H period and reading out the written 1H period color difference signal data at twice a speed of a writing speed thereof, wherein the reading out of the written 1H period data is initiated when 0.5H period color difference signal data is completely written;

(d) writing each of the color difference signals of 1H period and then reading out the written 1H period data at twice the speed of a writing speed thereof; and (e) selecting the 1H period data read out in said steps (c) and (d) alternately for predetermined time periods, respectively, to output color difference signals with multiplied vertical lines.

3. A vertical line multiplication method for adapting a video signal generated by use of a general purpose four charge coupled device (CCD) system including a G1 CCD, a G2 CCD, an R CCD and a B CCD into a high resolution standard, comprising the steps of:

(a) writing G1 channel data of a 1H period from the G1 CCD at a first writing speed and reading out the written G1 channel data at twice a speed of the first writing speed, wherein the reading out of the written 1H period data is initiated when 0.5H period G1 channel data is completely written;

(b) writing G2 channel data of a 1H period from the G2 CCD at the first writing speed and then reading out the written G2 channel data at twice the speed of the first writing speed;

(c) selecting the G1 and G2 channel data read out in said steps (a) and (b) alternately for first predetermined time periods, respectively, to output a G channel data with multiplied vertical lines;

(d) lowpass-filtering the G1 and G2 channel data to output low-frequency G channel data;

(e) generating color difference signals, R-$Y_L$, B-$Y_L$ and $G_L$-$Y_L$ by use of R channel data from the R CCD, B channel data from the B CCD, and the low frequency G channel data, respectively;

(f) writing each of the color difference signals of a 1H period at a second writing speed and reading out the written 1H period color difference signal data at twice a speed of the second writing speed, wherein the reading out of the written 1H period data is initiated when 0.5H period color difference signal data is completely written;

(g) writing each of the color difference signals of a 1H period at the second writing speed and then reading out the written 1H period color difference signal data at twice the speed of the second writing speed; and (h) selecting the 1H period color difference signal data read out in said steps (f) and (g) alternately for second predetermined time periods, respectively, to output color difference signals with multiplied vertical lines.

4. A vertical line multiplication method according to claim 3, wherein the second writing speed is lower than the first writing speed.

5. A vertical line multiplication method according to claim 3, wherein the first writing speed is twice the second writing speed.

6. A vertical line multiplication method for adapting a video signal generated by use of a general purpose four charge coupled device (CCD) system including a G1 CCD, a G2 CCD, an R CCD and a B CCD into a high resolution standard, comprising the steps of:

(a) writing G1 channel data of a 1H period from the G1 CCD at a first writing speed and reading out the written G1 channel data at twice a speed of the first writing speed, wherein the reading out of the written 1H period is initiated when 0.5H period G1 channel data is completely written;

(b) writing G2 channel data of a 1H period from the G2 CCD at the first writing speed and then reading out the written data at twice the speed of the first writing speed;

(c) selecting the G1 and G2 channel data read out in said steps (a) and (b) alternately for first predetermined time periods, respectively, to output a G channel data with multiplied vertical lines;

(d) writing R and B channel data of a 1H period from the R CCD and B CCD, respectively, at a second writing speed and reading out the written 1H period R and B channel data at twice a speed of the second writing speed, wherein the reading out of the written 1H period data is initiated when 0.5H period R and B channel data is completely written;

(e) writing R and B channel data of a 1H period from the R CCD and B CCD, respectively, at a second writing speed and then reading out the written 1H period R and B channel data at twice the speed of the second writing speed; and (f) selecting the 1H period R and B channel data read out in said steps (d) and (e) alternately for second predetermined time periods, respectively, to output color difference signals with multiplied vertical lines.

7. A vertical line multiplication method according to claim 6, wherein the second writing speed is lower than the first writing speed.

8. A vertical line multiplication method according to claim 6, wherein the first writing speed is twice the second writing speed.

9. A method for transforming a first broadcasting type signal into a second broadcasting type signal having a higher resolution, comprising the steps of:

(a) writing the first broadcasting type signal during a 1H period and reading out the written 1H period first broadcasting type signal at twice a speed of a writing speed of the 1H period first broadcasting type signal, wherein the reading out of the written 1H period is initiated when a 0.5H period first broadcasting type signal is completely written;

(b) writing the first broadcasting type signal during a 1H period and then reading out the written 1H first broadcasting type signal at twice the speed of a writing speed of the 1H period first broadcasting type signal; and (c) selecting the 1H period first broadcasting type signals read out in said steps (a) and (b) alternately for predetermined time periods, respectively, to output the second broadcasting type signal with multiplied vertical lines.

10. A vertical line multiplication circuit for multiplying a number of vertical lines to transform a first broadcasting type signal, which is imaged by use of four charge coupled devices (CCDs) including a G1 CCD, a G2 CCD, an R CCD and a B CCD, into a second broadcasting type signal having a higher resolution than that of the first broadcasting type signal, comprising:

a first memory for writing G1 channel data of a 1H period from said G1 CCD and reading out the written G1 channel data at twice a speed of a writing speed of the G1 channel data, wherein said first memory initiates the reading-out operation of the written 1H period when 0.5H G1 channel data is completely written;

a second memory for writing G2 channel data of a 1H period from said G2 CCD and then reading out the written G2 channel data at twice the speed of the writing speed of the G2 channel data; and a selection device for selecting the data from said first and second memories alternately for predetermined time periods, respectively, to output the selected data sequentially as a wide bandwidth G signal.

11. A vertical line multiplication circuit according to claim 10, wherein said first and second memories are FIFO memories.

12. A vertical line multiplication circuit according to claim 10, wherein said first and second memories are dual port RAMS.

13. A vertical line multiplication circuit according to claim 10, wherein the G2 channel data stored in said second memory is read out when a half sync period has elapsed after the G1 channel data stored in said first memory has been read out.

14. A vertical line multiplication circuit according to claim 10, wherein the G1 channel data stored in said first memory is read out when a half sync period has elapsed after the G2 channel data stored in said second memory has been read out.

15. A vertical line multiplication circuit for multiplying a number of vertical lines to transform a first broadcasting type signal, which is imaged by use of four charge coupled device (CCDs) including a G1 CCD, a G2 CCD, an R CCD and a B CCD, into a second broadcasting type signal having a higher resolution than that of the first broadcasting type signal, comprising:

a lowpass filter for lowpass-filtering G1 and G2 channel B data from said G1 CCD and G2 CCD, respectively, to output low-frequency G channel data;

a color difference signal generating device for generating color difference signals, R-$Y_L$, B-$Y_L$ and $G_L$-$Y_L$ by use of R channel data from said R CCD, B channel data from said B CCD, and the low frequency G channel data, respectively;

first memory means for writing each of the color difference signals of a 1H period and reading out the written 1H period data at twice a speed of a writing speed thereof, wherein said first memory means initiates the reading out operation of the written 1H period when 0.5H period color difference signal data is completely written;

second memory means for writing each of the color difference signals of 1H period and then reading out the written 1H period data at twice a speed of a writing speed thereof; and selection means for selecting the 0.5H and 1H period data read out from said first and second memory means alternately for predetermined time periods, respectively, to output color difference signals with multiplied vertical lines.

16. A vertical line multiplication circuit according to claim 15, wherein said first and second memory means are FIFO memories.

17. A vertical line multiplication circuit according to claim 15, wherein said first and second memory means are dual port RAMs.

18. A vertical line multiplication circuit according to claim 15, wherein the 1H period data stored in said second memory is read out when a half sync period has elapsed after the 0.5H period data stored in said first memory has been read out.

19. A vertical line multiplication circuit according to claim 15, wherein the 0.5H period data stored in said first memory is read out when a half sync period has elapsed after the 1H period data stored in said second memory has been read out.

20. A vertical line multiplication circuit for adapting a video signal generated by use of a general purpose four charge coupled device (CCD) system including a G1 CCD, a G2 CCD, an R CCD and a B CCD into a high resolution standard, comprising:

a first memory for writing G1 channel data of a 1H period from said G1 CCD at a first writing speed and reading out the written G1 channel data at twice a speed of the first writing speed, wherein said first memory initiates the reading-out operation of the written 1H period data when 0.5H period G1 channel data is completely written;

a second memory for writing G2 channel data of a 1H period from said G2 CCD at the first writing speed and then reading out the written G2 channel data at twice the speed of the first writing speed;

a first selection device for selecting the G1 and G2 channel data read out from said first and second memories alternately for first predetermined time periods, respectively, to output a G channel data with multiplied vertical lines;

a lowpass filter for lowpass-filtering the G1 and G2 channel data, to output a low-frequency G channel data;

a color difference signal generating device for generating color difference signals, $R-Y_L$, $B-Y_L$ and $G_L-Y_L$ by use of R channel data from said R CCD, B channel data from said B CCD, and the low-frequency G channel data, respectively;

a third memory for writing each of the color difference signals of a 1H period at a second writing speed and reading out the written 1H period data at twice a speed of the second writing speed thereof, wherein said third memory initiates the reading-out operation of the written 1H period data when 0.5H period color difference signal data is completely written;

a fourth memory for writing each of the color difference signals of a 1H period at the second writing speed and then reading out the written 1H period data at twice the speed of the second writing speed; and a second selection device for selecting the 1H period data read out from said third and fourth memories alternately for second predetermined time periods, respectively, to output color difference signals with multiplied vertical lines.

21. A vertical line multiplication circuit according to claim 20, wherein said first through fourth memories are FIFO memories.

22. A vertical line multiplication circuit according to claim 20, wherein said first through fourth memories are dual port RAMs.

23. A vertical line multiplication circuit according to claim 20, wherein the second writing speed is lower than the first writing speed.

24. A vertical line multiplication circuit according to claim 20, wherein the first writing speed is twice the second writing speed.

25. A vertical line multiplication method of multiplying a number of vertical lines to transform a first broadcasting type signal into a second broadcasting type signal having a higher resolution, comprising the steps of:

(a) low pass filtering the first broadcasting type signal;

(b) dividing the low pass filtered first broadcasting type signal into red, blue, G1, and G2 signals, wherein the G1 and G2 signals are green signals, and the G2 signal is shifted by one horizontal line from the G1 video signal;

(c) writing the G1 signal of a 1H period, and then reading out the written G1 signal at twice a speed of the writing speed thereof;

(d) writing the G2 signal of a 1H period, and then reading out the written G2 signal at twice a speed of the writing speed thereof; and (e) alternately selecting the G1 and G2 signals read out in said steps (a) and (b) for predetermined time periods, respectively, and sequentially outputting the selected signals as a wide bandwidth G signal.

26. A vertical line multiplication method as claimed in claim 25, further comprising the steps of:

(f) low pass filtering the red and blue signals;

(g) low pass filtering the G1 and G2 signals to generate a low-frequency G signal;

(h) generating color difference signals $R-Y_L$, $B-Y_L$, and $G_L-Y$ using the low pass filtered red and blue signals, and the low-frequency G signal;

(i) writing each of the color difference signals of a 1H period and reading out the written 1H period signals at twice a speed of the writing speed thereof, wherein the reading out of the written 1H period signals is initiated when 0.5H period color difference signals are completely written;

(j) writing each of the color difference signals of a 1H period, and then reading out the written 1H period signals at twice a speed of the writing speed thereof; and (k) alternately selecting the 1H period signals read out in said steps (i) and (j) for predetermined time periods, respectively, to output color difference signals with multiplied vertical lines.

27. A vertical line multiplication circuit for multiplying a number of vertical lines to transform a first broadcasting type signal into a second broadcasting type signal having a higher resolution, comprising:

an optical system to divide the first broadcasting type signal into red, blue, G1, and G2 signals, wherein the G1 and G2 signals are green signals, and the G2 signal is shifted by one horizontal line from the G1 video signal;

a first memory, having a 0.5H period capacity, to write the G1 signal of a 1H period from the optical system and read out the written G1 signal at twice a speed of the writing speed thereof, wherein said first memory initiates the reading-out operation of the written 1H period signal when a 0.5H period G1 signal is completely written;

a second memory, having a 1H period capacity, to write the G2 signal of the 1H period, and then read out the written G2 signal at twice a speed of the writing speed thereof; and a selector to alternately select the G1 and G2 signals read out from said first and second memories for predetermined time periods, respectively, and sequentially outputting the selected signals as a wide bandwidth G signal.

28. A vertical line multiplication circuit as claimed in claim 27, wherein said first and second memories are FIFO memories.

29. A vertical line multiplication circuit as claimed in claim 27, wherein said optical system includes
a first low pass filter to low pass filter the first broadcasting type signal,
a prism to divide the first broadcasting type signal into red, blue, G1, and G2 signals,
a second low pass filter to low pass filter the red signal,
a third low pass filter to low pass filter the blue signal, and
R, B, G1 and G2 charge coupled devices to image the low pass filtered red signal, the low pass filtered blue signal, the G1 signal, and the G2 signal, respectively.

30. A vertical line multiplication circuit as claimed in claim 29, wherein only effective pixel portions of said G1 and G2 signals are written into said first and second memories, respectively.

31. A vertical line multiplication circuit as claimed in claim 29, further comprising:

a fourth low pass filter to low pass filter the G1 and G2 signals to generate a low-frequency G signal;

a color difference signal generating circuit to generate color difference signals $R-Y_L$, $B-Y_L$, and $G_L-Y$ using the red and blue signals, and the low-frequency G signal output from said optical system;

a third memory to write each of the color difference signals of a 1H period and reading out the written 1H period signals at twice a speed of the writing speed thereof, wherein said third memory initiates the reading-out operation of the written 1H period signals when a 0.5H period color difference signal is completely written;

a fourth memory to write each of the color difference signals of a 1H period, and then reading out the written 1H period signals at twice a speed of the writing speed thereof; and a second selector to alternately select the 1H period signals read out from said third and fourth memories for predetermined time periods, respectively, to output color difference signals with multiplied vertical lines.

* * * * *

UNITED STATES PATENT AND TRADEMARK OFFICE
CERTIFICATE OF CORRECTION

PATENT NO.: 6,020,922
DATED : February 1, 2000
INVENTOR(S): Hyo-seung LEE

It is certified that error appears in the above-identified patent and that said Letters Patent is hereby corrected as shown below:

Title Page, Item [73], "Ltd.," should be --Ltd.--;

Title Page, Item [56], U.S. Patent Documents,
  4,583,113   4/1986   "Pritchhard" should be --Pritchard--;

Column 10, line 7, "Bdata from said" should be --data from said--.

Signed and Sealed this

Thirteenth Day of March, 2001

Attest:

NICHOLAS P. GODICI

Attesting Officer         Acting Director of the United States Patent and Trademark Office

UNITED STATES PATENT AND TRADEMARK OFFICE
CERTIFICATE OF CORRECTION

PATENT NO.:   6,020,922
DATED      :   February 1, 2000
INVENTOR(S):   Hyo-seung LEE It is certified that [an/error[s]] appears in the above-identified patent and that said Letters Patent is hereby corrected as shown below:

Title Page, Item [56], Foreign Patent Documents,
    2 090 505    "7/1992" should be --7/1982--.

Signed and Sealed this

Twenty-second Day of May, 2001

Attest:

NICHOLAS P. GODICI

*Attesting Officer*    *Acting Director of the United States Patent and Trademark Office*